C. W. HOWLAND.
CURVE MEASURING INSTRUMENT.
APPLICATION FILED MAR. 8, 1918.
1,430,738.
Patented Oct. 3, 1922.
2 SHEETS—SHEET 1.
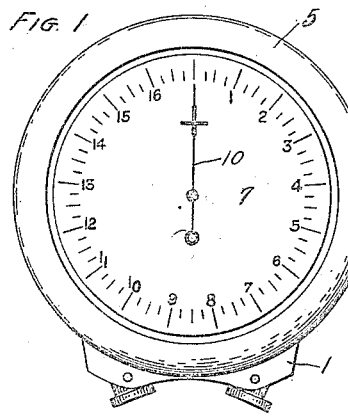
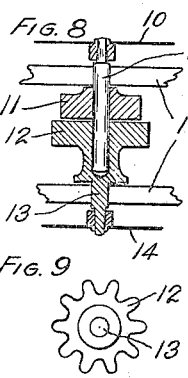
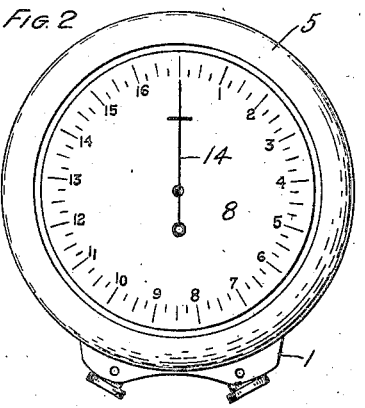
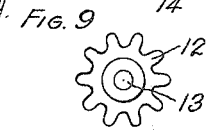
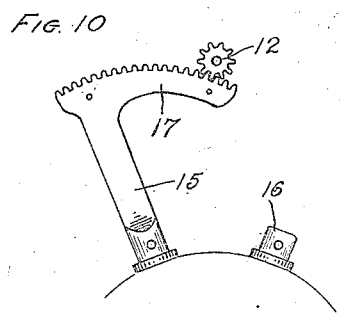
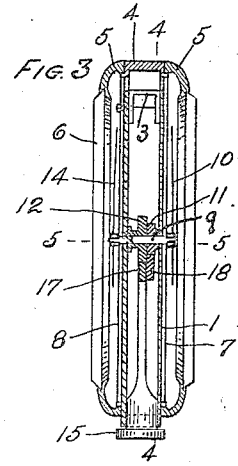
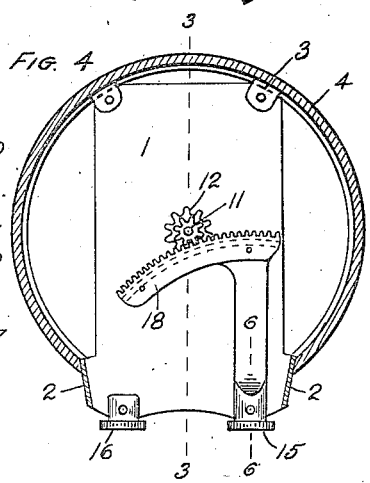
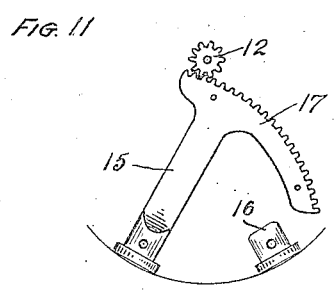
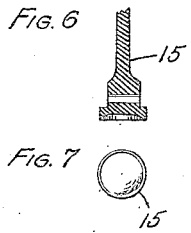
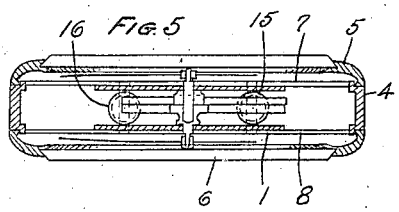
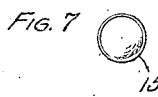
Inventor
Chauncey W. Howland

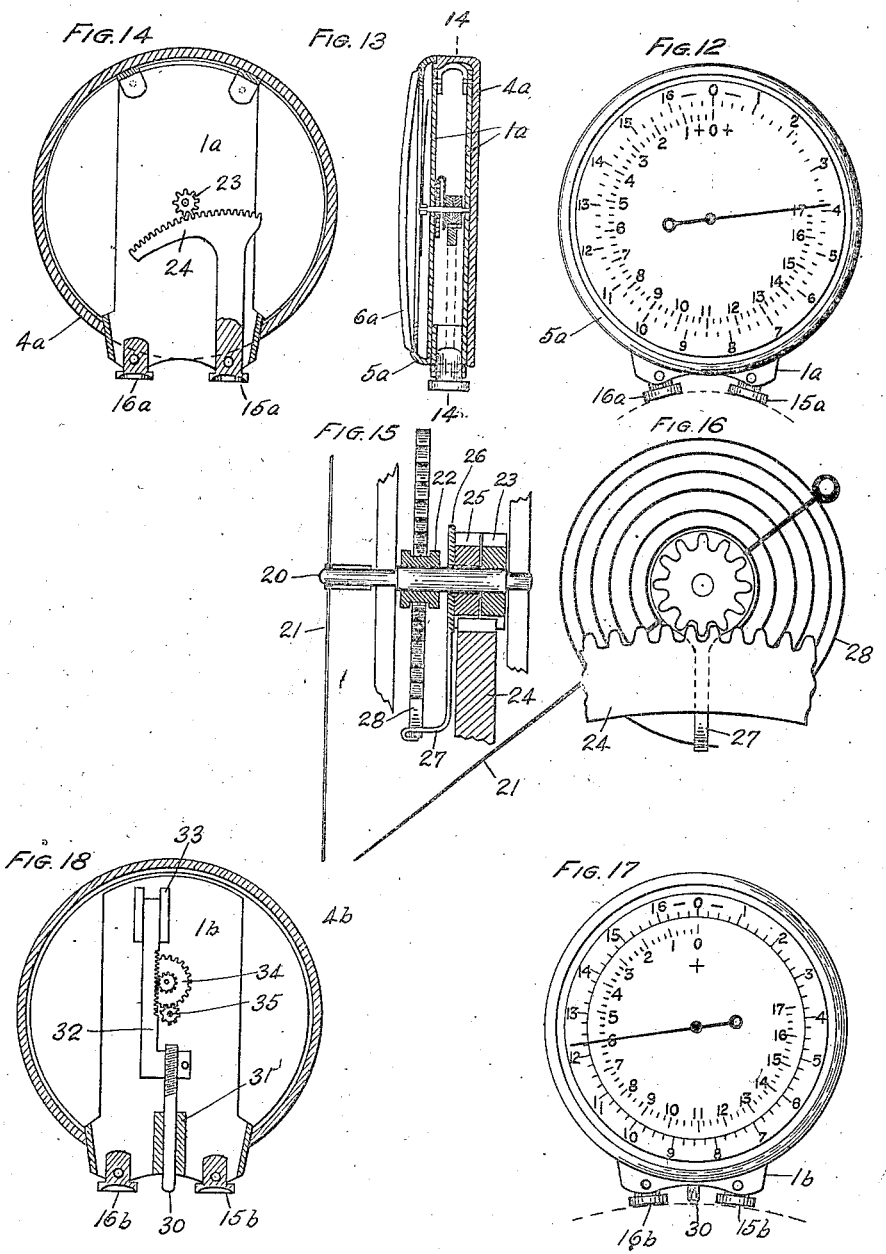

Patented Oct. 3, 1922.

1,430,738

UNITED STATES PATENT OFFICE.

CHAUNCEY W. HOWLAND, OF GENEVA, NEW YORK.

CURVE-MEASURING INSTRUMENT.

Application filed March 8, 1918. Serial No. 221,245.

*To all whom it may concern:*

Be it known that I, CHAUNCEY W. HOWLAND, a citizen of the United States, residing at Geneva, in the county of Ontario and State of New York, have invented certain new and useful Improvements in Curve-Measuring Instruments, of which the following is a specification.

The present invention relates to that class of measuring instruments by means of which the degree of curvature of a regularly curved surface may be mechanically ascertained. The invention is particularly useful in measuring the curvature or radii of lenses and of laps or grinding tools used in the manufacture of lenses, in which case the device has a graduated scale of dioptric power of lenses computed from the radius of the curved surface measured.

The present day requirements of the optical trade are so exacting that, from the workman in the shop to the dealer or oculist, all must be provided with some convenient means for measuring the focii of lenses with precision and ease. The object of this invention therefore is; first, to provide an instrument whereby more accurate measurement of lenses can be made and errors common in instruments at present in general use eliminated and, second, to provide an instrument that the lens grinder or optician may use to test the correctness of his laps or grinding tools. Such an instrument will be a valuable addition to the optician's equipment, its utility being particularly appreciated in the measurement of deep curves where, as is well known, gauges are unsatisfactory and their use attended with no little difficulty. This instrument is not intended to wholly take the place of gauges but rather to provide a rapid yet accurate means of measuring lenses and laps particularly those of deep curvature and it is to be noted that by this instrument strong and weak curves, either positive or negative, may be measured with equal precision.

An advantage of this instrument over those at present in general use is that by reason of the fact that it employs contact surfaces of relatively large area but little care is required to properly place the instrument against the lens.

From the nature of its construction the contact or bearing surfaces of this instrument are not confined to points which inevitably wear becoming more or less rounded and thereby introducing errors in reading. Moreover instruments with point contacts are not adapted to the measurement of laps where the surface may be true yet comparatively rough on account of the presence of tool marks. The elimination of points also avoids the possibility of scratching highly polished surfaces of lenses.

Further objects and advantages of this invention will appear in the following description, and the novel features thereof will be particularly pointed out in the appended claims.

In the drawings:

Fig. 1 is a view of one face of my device showing the dial for measuring positive curves;

Fig. 2 is a similar view of the opposite face showing the dial for measuring negative curves;

Fig. 3 is a central section taken on the line 3—3 of Figure 4;

Fig. 4 is a section taken on the line 4—4 of Fig. 3;

Fig. 5 is a section taken on the line 5—5 of Fig. 3;

Fig. 6 is a section of a portion of a contact member taken on the line 6—6 of Fig. 4;

Fig. 7 is a plan view of the contact member shown in Figure 6;

Fig. 8 is a detail of the spindle and pinions shown in Figures 3 and 5 but drawn to a larger scale;

Fig. 9 is an end view of the larger pinion of Fig. 8;

Fig. 10 shows the positions assumed by the contact members when engaging a convex surface;

Fig. 11 shows the same members when engaging a concave surface;

Fig. 12 is a view of the face of a modified form of my device;

Fig. 13 is a central vertical section of the modification of Fig. 12;

Fig. 14 is a section on line 14—14 of Fig. 13;

Fig. 15 is a detail on an enlarged scale showing the spindle, gears and means for taking up back-lash;

Fig. 16 is a side view of Figure 15;

Fig. 17 is a face view of another modification;

Fig. 18 is a section of the modification of Figure 17 showing the operating mechanism thereof;

The same numbers refer to the same parts throughout the views. A frame or body 1 is composed of two parallel plates secured together by two bent up portions 2 and by a pair of bent up U-shaped members 3. This frame is securely fitted within a casing 4 having a cut away portion at its lower side and to each side of which is fitted a bezel 5 carrying a crystal 6. Each of the two plates composing the frame carries a dial graduated in diopters, dial 7 on one side being adapted for the measurement of convex surfaces and dial 8 on the other side being adapted for the measurement of concave surfaces. Pivotally mounted in one plate of the frame 1 is a spindle 9 carrying a pointer 10 and pinion 11 and having a bearing in a second pinion 12. This latter pinion, shown more clearly in Figure 8, has an extension 13 journaled in the other plate composing the frame and to the outer end of this extension is secured a second pointer 14.

Pivoted to the lower portion of the frame are two contact members 15 and 16 each having a circular head terminating in a concave end face as more clearly shown in Figures 6 and 7. The purpose of this concave end face is to give to the members 15 and 16 a contact surface in the form of a ring the concavity being purposely made greater than the strongest curve that the instrument is adapted to measure. Integral with the contact member 15 is a gear segment 17 meshing with the pinion 12, as more clearly shown in Figures 10 and 11, the former figure illustrating the positions assumed by the two contact members and gear segment when a convex surface of strong curvature is being measured and the latter figure similiarly illustrating the positions assumed by those members when a concave surface of strong curvature is measured. Suitably secured to one face of the gear segment 17 is a separate gear segment 18 adapted to mesh with the pinion 11. The reason for the employment of a double gear segment and two pinions, one in cooperative relation with each pointer, will be explained hereinafter.

As has been previously stated, readings of convex surfaces are taken from one dial and readings of concave surfaces are taken from the other dial. It is desirable that a curve of the same degree whether it be convex or concave shall produce approximately the same angular movement of the pointer. This however is not obtained where both pointers are actuated by a single pinion driven by a single gear segment for the reason that the arc subtended by the two contact members 15 and 16 in the case of a convex surface as shown in Figure 10 is less than the arc subtended by those members in the case of a concave surface as shown in Figure 11. To compensate for this difference in deflection the two pinions 11 and 12 are made with a different number of teeth, the pinion 11 which actuates the pointer 10 cooperating with the plus dial 7 being constructed with 8 teeth, in this instance, while the pinion 12 which actuates the pointer 14 cooperating with the minus dial 8 is constructed with 10 teeth. With the operative parts otherwise proportioned as illustrated by the drawing the two dials may be constructed substantially identical.

The modification illustrated by Figures 12 to 16 inclusive has a frame $1^a$ similar to the frame 1 secured within a casing $4^a$ having a solid back and carrying at the front side a crystal $6^a$ mounted in a bezel $5^a$. A spindle 20 pivotally mounted in the frame $1^a$ carries at one end a pointer 21 and secured thereto intermediate its ends are a ferrule 22 and a pinion 23. A gear segement 24 integral with the contact member $15^a$ meshes with the pinion 23 and thus actuates the pointer 21. The dial and the front frame plate $1^a$ in this modification are made in one piece, the dial having inscribed thereon two sets of graduations, one for positive curves and one for negative curves, as clearly shown in Figure 12. An idle contact member $16^a$ is pivoted to the frame as in the form previously described.

In order to overcome errors in indication due to the effect of back-lash, a pinion 25, identical with the pinion 23, is loosely mounted upon the spindle 20 and this pinion has secured to it a disk 26 having an arm 27. A hair spring 28 is attached at its outer end to the arm 27 and at its inner end is attached to the ferrule 22. It will be seen that the spring rotates as a whole with the spindle 20 and if put under slight tension when connected to the arm 27 all back-lash will be eliminated. Obviously any well known means for taking up back-lash may be employed in lieu of the means herein disclosed, and any suitable means may be employed to take up the back-lash in the case of the instrument illustrated in Figures 1 to 5 the showing of any such means having been purposely omitted for the sake of simplicity.

The modification illustrated by Figures 17 and 18 has a frame $1^b$ secured in a housing $4^b$ together with a dial and cooperating pointer substantially like that of the modification illustrated by Figures 12, 13 and 14. In this case the two contact members 15ᵇ and 16ᵇ are similar to the contact members 16 and 16ᵃ respectively of the two previously described modifications. A contact rod 30 slides in a guide 31 and at its upper end is screw threaded into an L-shaped member 32 supported between guides 33. This member 32 is provided with a rack on one side and by suitable gearing 34, the longitudinal movement of the rod 30 is converted, with the necessary multiplication, into rotary movement of the pinion 35 and pointer connected therewith. It is to be noted that the lower or contact end of the rod 30 is not made pointed as has heretofore been the custom but is made rounded. The reason for this is that, when the instrument is placed against a plane, convex or concave surface, it naturally assumes a position with the rod 30 at right angles to the surface at the point of contact. Rocking of the instrument on the surface being measured together with the attendant variation in reading common to three point contact instruments now in general use is thereby eliminated. Inasmuch as a sharp point is unnecessary the rod 30 may be given a rounded contact end thereby greatly reducing the possibility of scratching the surface being measured. This rounded end may have a radius of curvature only slightly less than the radius of the deepest curve the instrument is adapted to measure.

Having described my invention, what I claim as new and desire to secure by Letters Patent is:

1. A device for measuring the curvature of a curved surface, having a frame, a member carried thereby for contact with said surface, a second member for contact with said surface pivoted to swing in a plane passing through said two members and having a contacting face for engaging said curved surface simultaneously at a plurality of points at various distances from said plane to thereby support said member substantially perpendicular to said surface.

2. A curve measuring instrument having a frame, indicating mechanism carried thereby and a pair of supporting members, said members being pivoted to said frame to swing in a common plane and to seat themselves on a curved surface and having end portions constructed to make contact with a curved surface at a plurality of points out of alinement whereby the instrument may be supported in stable equilibrium on said surface, one of said members being connected to actuate said indicating mechanism.

3. A curve measuring instrument comprising a frame, a dial and a co-operating pointer carried thereby, a pair of members secured to said frame and adapted to make contact with a curved surface to be measured, one of said members having an operative connection with said pointer and being pivoted to said frame at right angles to the plane of said members, the contact end of said one member being of circular form and concaved whereby it will seat against the curved surface to be measured and assume a definite position relative thereto.

4. An instrument for measuring the curvature of a curved surface including a frame, a pair of supporting members having faces adapted to contact with said surface, one of said members being pivoted to said frame to swing in a plane common to said two members and constructed to have a circular line of contact with said surface, and a co-operating dial and pointer, one connected with said frame and the other with said pivoted member to indicate their relative positions.

5. A surface curvature measuring device comprising a body frame, a dial carried thereby, a pointer co-operating with said dial, a member carried by said frame for contacting with the surface to be measured and a pointer-actuating member pivoted to said frame and constructed with a centrally depressed end face to also contact with said surface whereby the latter member will assume a position normal to the curved surface when brought in contact therewith.

6. A surface curvature measuring device comprising a frame, a dial carried thereby, a pointer co-operating with said dial, a pair of contact members pivoted to said frame to swing in the same plane and constructed with annular contact faces for making contact with a surface to be measured whereby said members when brought in contact with a curved surface assume a definite angle relative to each other and means connecting said pointer with one of said members.

7. A curve measuring device comprising a frame, a pair of dials carried on opposite sides thereof, a shaft journaled in said frame, a pointer carried by said shaft and co-operating with one of said dials, a sleeve revolubly mounted on said shaft, and a second pointer carried thereby and co-operating with said other dial, a pair of pinions mounted respectively on said shaft and said sleeve, an operating member pivoted to the frame and having at one end a pair of gear segments in engagement with the said pinions and at the other end a cup-shaped portion adapted to engage a curved surface.

8. In a device for indicating the curvature of a spherical surface by contact therewith, the combination of a supporting frame having a contact member, a second contact member spaced from said first member and pivoted to said frame to move in a plane extending at right angles to the plane of its contact face and passing through said first member, said second member having a rigid, non-yielding contact portion adapted to support the member and the frame in a definite, substantially radial, position on the said spherical surface.

9. In a device for measuring the curvature of a spherical surface, a frame, a pair of spaced members pivoted thereto to swing in the same plane, each of said members having an annular contact face for engaging the surface to be measured.

In witness whereof, I have hereunto set my hand this 8th day of March, 1918.

CHAUNCEY W. HOWLAND.